United States Patent
Hwang

(10) Patent No.: US 8,210,508 B2
(45) Date of Patent: Jul. 3, 2012

(54) BUMP STOPPER FOR SUSPENSION SYSTEM

(75) Inventor: Seong Wook Hwang, Hwaseong (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 749 days.

(21) Appl. No.: 12/336,326

(22) Filed: Dec. 16, 2008

(65) Prior Publication Data

US 2009/0288923 A1     Nov. 26, 2009

(30) Foreign Application Priority Data

May 23, 2008    (KR) .................. 10-2008-0048210

(51) Int. Cl.
| | |
|---|---|
| F16F 1/36 | (2006.01) |
| F16F 7/00 | (2006.01) |
| F16F 9/00 | (2006.01) |
| F16F 11/00 | (2006.01) |
| B60G 13/00 | (2006.01) |
| B60G 15/00 | (2006.01) |

(52) U.S. Cl. ........ 267/153; 267/219; 267/220; 267/223; 267/140.5; 280/124.177

(58) Field of Classification Search .................. 267/153, 267/219, 220, 223, 140.5; 280/129.177
See application file for complete search history.

(56) References Cited

U.S. PATENT DOCUMENTS

| | | | |
|---|---|---|---|
| 2,962,311 A * | 11/1960 | Tidd | 280/687 |
| 6,202,995 B1 * | 3/2001 | Jou | 267/293 |
| 7,540,478 B2 * | 6/2009 | de Fontenay et al. | 267/140.12 |

FOREIGN PATENT DOCUMENTS

| | | |
|---|---|---|
| JP | 8-247204 A | 9/1996 |
| JP | 2006-281811 A | 10/2006 |
| KR | 1998-061996 U | 11/1998 |

* cited by examiner

*Primary Examiner* — Lesley D. Morris
*Assistant Examiner* — Syed A Islam
(74) *Attorney, Agent, or Firm* — Morgan, Lewis & Bockius LLP

(57) ABSTRACT

A bump stopper for a suspension system that has at least a parting line along a longitudinal direction of the bumper stopper, may include at least two convex portions coaxially connected each other in the longitudinal direction of the bump stopper and contacting each other in a compressed state, a first array including first reinforcing blocks integrally formed on the respective convex portions along the parting line, each abutting first reinforcing block having a first contact angle therebetween in the longitudinal direction of the bumper stopper, and a second array including second reinforcing blocks integrally formed on the respective convex portions, each abutting second reinforcing block having a second contact angle therebetween in the longitudinal direction of the bumper stopper, wherein the first array is disposed with a predetermined angle from the first array along a circumferential direction of the bumper stopper.

14 Claims, 6 Drawing Sheets

BUMP STOPPER FOR SUSPENSION SYSTEM

CROSS-REFERENCE TO RELATED APPLICATION

The present application claims priority to Korean Patent Application Number 10-2008-0048210 filed on May 23, 2008, the entire contents of which are incorporated herein for all purposes by reference.

BACKGROUND OF THE INVENTION

1. Field of the Invention

The present invention relates to a bump stopper for a suspension system. More particularly, the present invention relates to a bump stopper for a suspension system that contacts a stopper plate in a case of excessive turning so as to prevent chassis components from being overlapped with each other.

2. Description of Related Art

Generally, a suspension system of a vehicle is disposed between a vehicle body and a vehicle wheel, and connects the vehicle body with the vehicle wheel by using a plurality of links. A suspension system of coupled torsion beam axle (CTBA) type is one of such suspension systems of a vehicle.

As shown in FIG. 1, the suspension system of a CTBA type includes a torsion beam 1 disposed to a horizontal direction, and trailing arms 9 are welded to both ends of the torsion beam 1. A spindle bracket 7 for installing a tire 3 and a wheel 5 to the trailing arm 9 is provided at one end thereof.

In addition, a bushing 11 for connecting the trailing arm 9 to a vehicle body (not shown) is provided at the other end of the trailing arm 9, and a spring seat 15 for mounting a spring 13 and a mounting pin 19 for connecting a shock absorber 17 to the trailing arm 9 are mounted respectively at the one end and a middle portion thereof.

According to such a suspension system, a stopper plate 21 is mounted at an upper surface of the spring seat 15, and an upper end of the spring 13 is connected to the vehicle body. An upper portion of the spring 13 encloses a bump stopper 23 confronting the stopper plate 21.

The bump stopper 23 limits a maximum bump stroke and is provided respectively at both ends of the vehicle body. Here, "bump" means that the vehicle body goes toward the ground in a case that a vehicle turns, and "rebound" means the vehicle body goes up in an opposite direction of the ground.

In a case of excess turning, the bump stopper 23 contacts the stopper plate 21 and applies a load thereto so as to prevent chassis components from being overlapped with each other.

Such a bump stopper 23, as shown in FIG. 2, includes at least two convex portions B1 and B2 contacting each other in a compressed state, it limits the bump stroke of the suspension system, and it insulates low and high frequency vibration and impact. The bump stopper 23 is generally made of polyurethane materials. However, polyurethane materials is more expensive than rubber materials, and thus the material cost of the bump stopper 23 made of polyurethane materials is high.

On the contrary, when the bump stopper 23 is made of rubber materials, vibration-absorption capacity may be deteriorated since the damping coefficient of rubber materials is nearly "0". Therefore, additional energy-absorbing devices for lowering a peak value of vibration and impact applied to the bump stopper 23 may be required.

In addition, if a bump stopper 23 made of rubber materials has the same shape as a bump stopper 23 made of polyurethane materials, durability at overlapped portions P1, P2, and P3 of rubber materials as well as insulation capacity may be deteriorated, as shown in FIG. 3. Insulation capacity can be secured by reducing the thickness of the bumper stopper 23 or by boring holes that affect the damping capacity of materials, but durability of the bump stopper having the general shape cannot be secured because of a parting line PL created in a bonding process of the rubber materials.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to Provide a bump stopper for a suspension system having advantages of causing stress applied thereto to be decentralized as a consequence of reinforcing blocks having a predetermined contact angle being provided respectively at upper and lower exterior circumferences of the bump stopper that contact each other in a bump state of a vehicle.

In an aspect of the present invention, a bump stopper for a suspension system that has a parting line along a longitudinal direction of the bumper stopper and at least two convex portions coaxially connected each other and contacting each other in a compressed state, may include a plurality of first reinforcing blocks integrally formed on the respective convex portions at the parting line, having a constant width along a circumferential direction of the bumper stopper, and forming a first contact angle therebetween, and a plurality of second reinforcing blocks integrally formed on the respective convex portions in the longitudinal direction of the bumper stopper, having a constant width along the circumferential direction of the bumper stopper, and forming a second contact angle therebetween, wherein the plurality of the second reinforcing blocks are disposed from the parting line with a constant angle along the circumferential direction of the bumper stopper.

The first contact angle may be larger than the second contact angle.

The constant width of the second reinforcing blocks may be larger than the constant width of the first reinforcing blocks.

In another aspect of the present invention, a bump stopper for a suspension system that has a parting line along a longitudinal direction of the bumper stopper and upper and lower convex portions coaxially connected each other and contacting each other in a compressed state, may include first upper and lower reinforcing blocks integrally formed along the parting line respectively on the upper and lower convex portions, having a constant width along a circumferential direction of the bumper stopper, and forming a first contact angle therebetween in the longitudinal direction of the bumper stopper, and second upper and lower reinforcing blocks integrally formed respectively on the upper and lower convex portions, having a constant width along the circumferential direction of the bumper stopper and a second contact angle therebetween in the longitudinal direction of the bumper stopper, wherein the second contact angle is smaller than the first contact angle and the second upper and lower reinforcing blocks are disposed from the parting line with a right angle along the circumferential direction of the bumper stopper.

The constant width of the second upper and lower reinforcing blocks may be wider than the constant width of the first upper and lower reinforcing blocks along the circumferential direction of the bumper stopper.

In further another aspect of the present invention, a bump stopper for a suspension system that has at least a parting line along a longitudinal direction of the bumper stopper, may include at least two convex portions coaxially connected each other in the longitudinal direction of the bump stopper and contacting each other in a compressed state, a first array including first reinforcing blocks integrally formed on the respective convex portions along the parting line, each abutting first reinforcing block having a first contact angle therebetween in the longitudinal direction of the bumper stopper, and a second array including second reinforcing blocks integrally formed on the respective convex portions, each abutting second reinforcing block having a second contact angle therebetween in the longitudinal direction of the bumper stopper, wherein the first array is disposed with a predetermined angle from the first array along a circumferential direction of the bumper stopper.

The convex portions may be monolithically formed.

Longitudinal length of the respective convex portion may be substantially the same.

The number of the first reinforcing blocks formed in the respective convex portion may be less than or equal to that of the second reinforcing blocks in the same respective convex portion.

The first and second arrays may be aligned substantially in parallel in the longitudinal direction of the bump stopper.

The first and/or second arrays may be formed on outer surface of the convex portions.

The first and/or second arrays may be formed on inner surface of the convex portions.

The first contact angle of the first reinforcing blocks may be larger than the second contact angle of the second reinforcing blocks.

The first contact angle may be approximately 60°.

The second contact angle may be approximately 30°.

The second array may be wider than the first array in the circumferential direction of the bumper stopper.

In case that a plurality of parting lines is formed on the bumper stopper, one first array may be formed along each parting line and at least one second array may be disposed between abutting first arrays along the longitudinal direction of the bumper stopper.

The bumper stopper may be made up of rubber.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
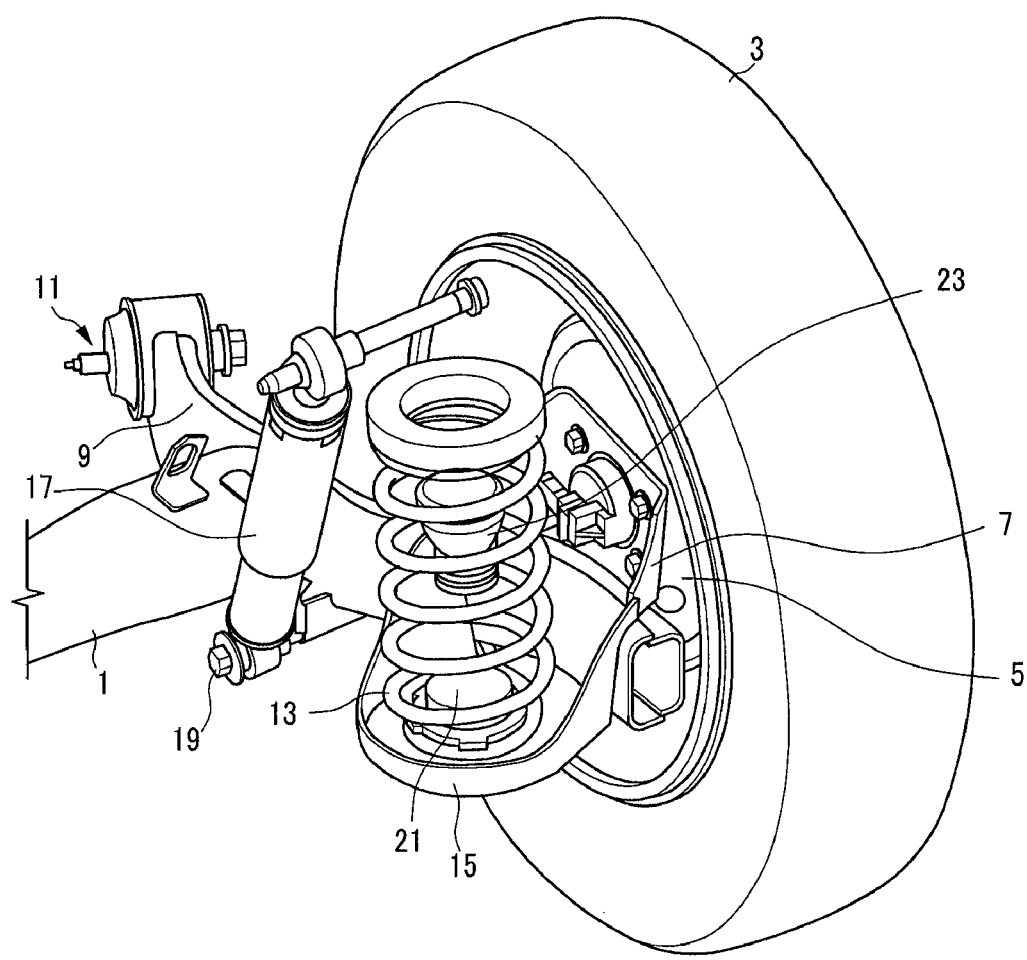
FIG. 1 is a partial perspective view of a suspension system provided with a conventional bump stopper.
Figure 2:
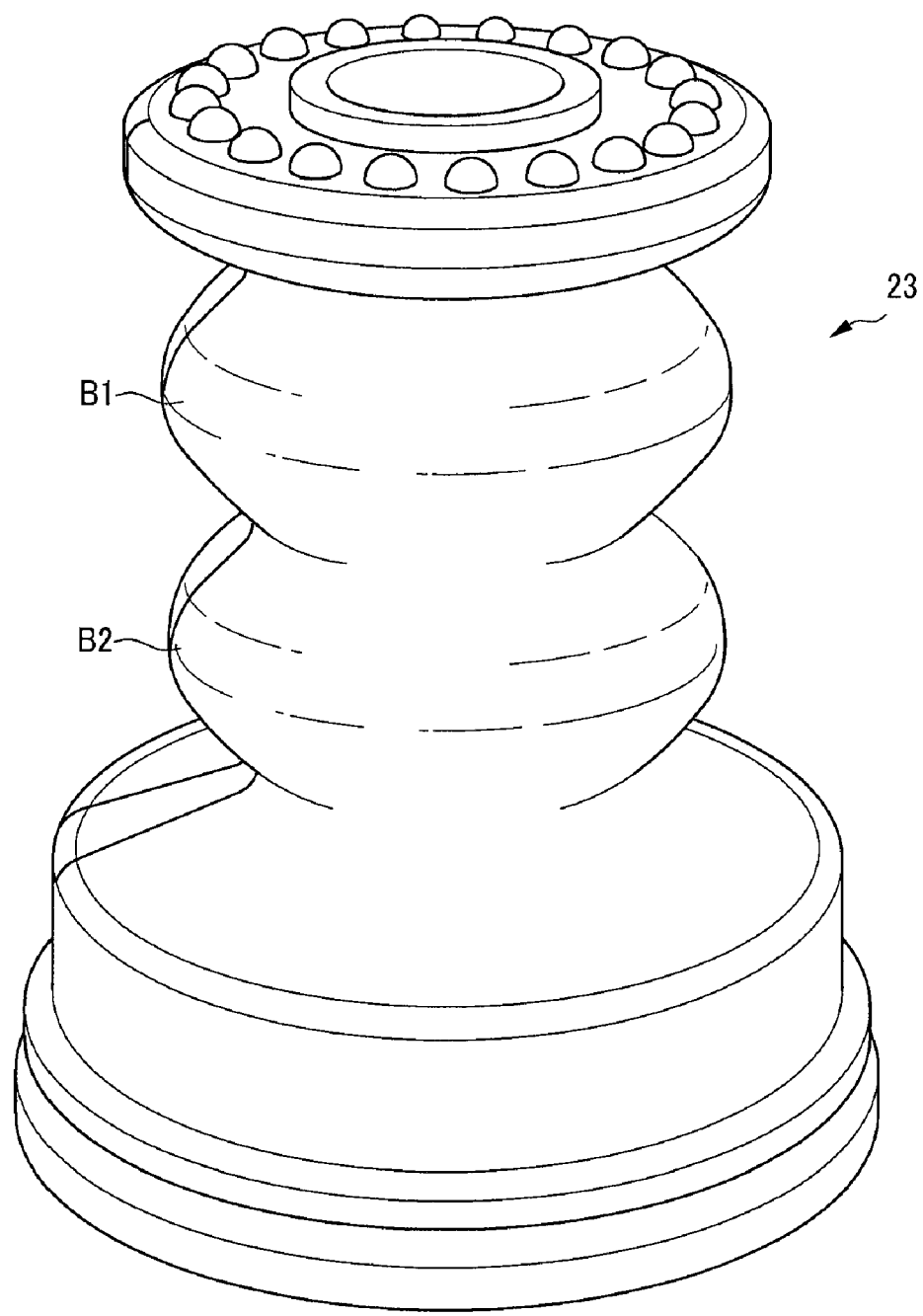
FIG. 2 is a perspective view of a conventional bump stopper for a suspension system.
Figure 3:
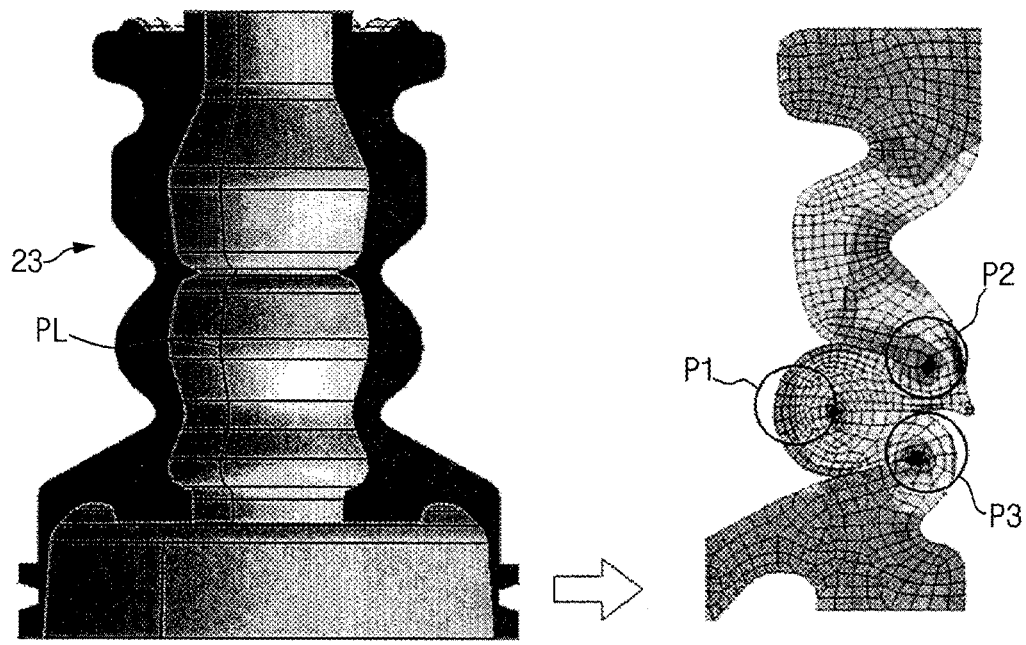
FIG. 3 is a scatter diagram of stress in a compressed state of a conventional bump stopper.
Figure 4:
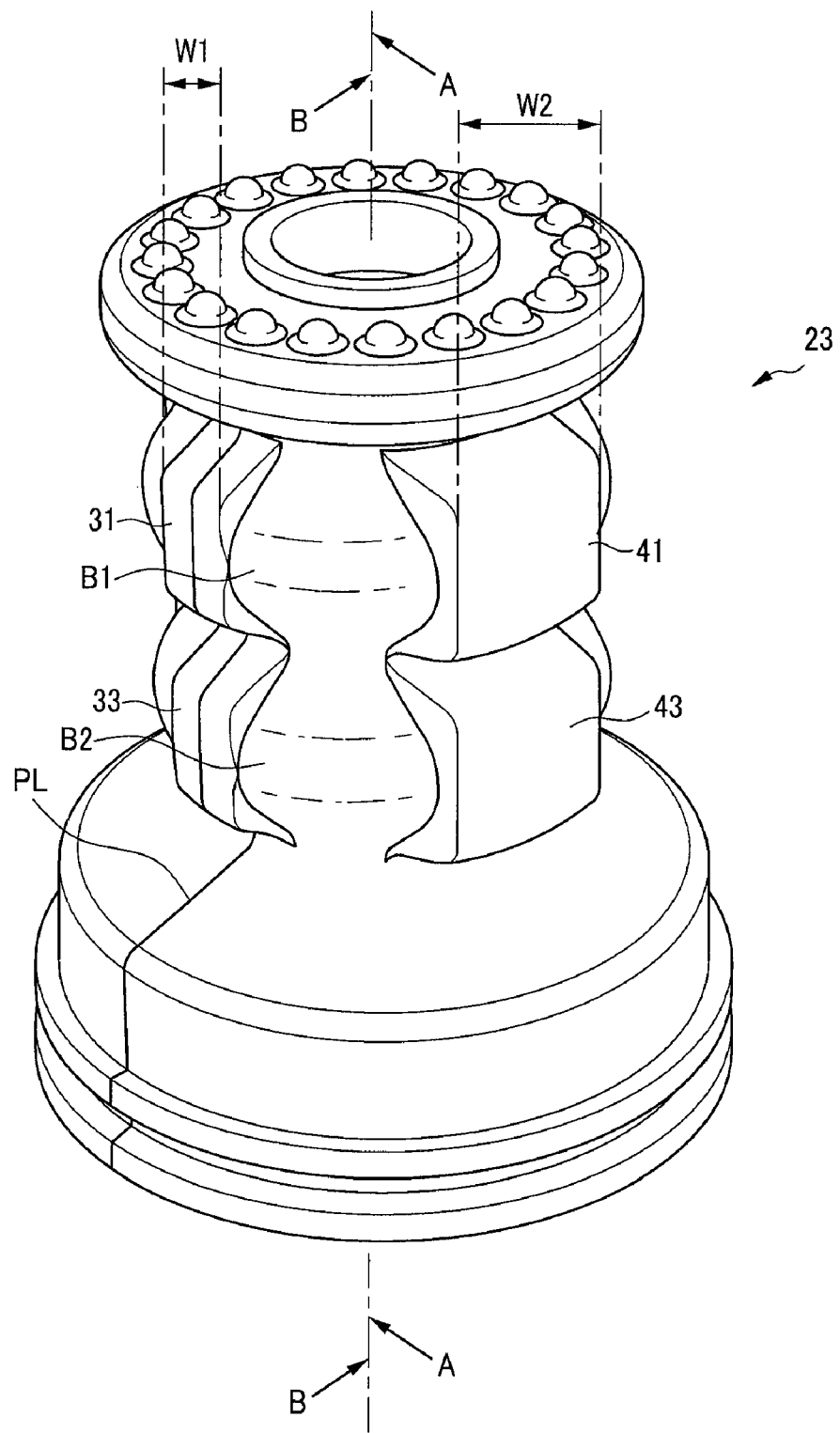
FIG. 4 is a perspective view of an exemplary bump stopper for a suspension system according to the present invention.

FIG. 4 is a perspective view of a bump stopper for a suspension system according to various embodiments of the present invention.

In describing the present invention, the same components as in the prior art are denoted by the same reference symbols.

A bump stopper 23 for a suspension system according to various embodiments of the present invention is made of rubber materials having a parting line PL along a length direction thereof, and is provided with two convex portions B1 and B2 contacting each other in a compressed state.

In addition, the bump stopper 23 is provided with first reinforcing blocks 31 and 33 integrally formed respectively with the upper and lower convex portions B1 and B2. The first reinforcing blocks 31 and 33 have a constant width W1 along the circumferential direction of the upper and lower convex portions B1 and B2 at the parting line PL.

Figure 5:
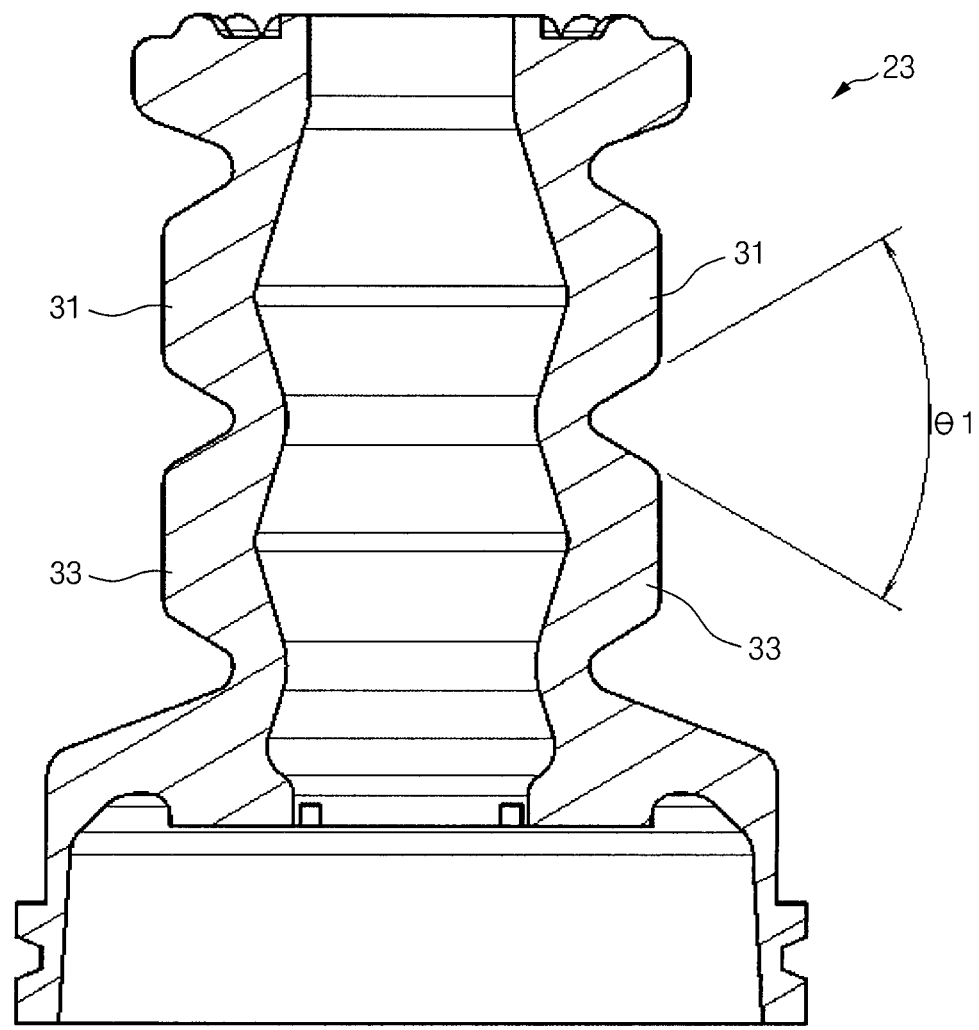
FIG. 5 is a cross-sectional view taken along the line A-A in FIG. 4.

Here, the first upper and lower reinforcing blocks 31 and 33, as shown in FIG. 5, form a first contact angle θ1 therebetween. The first contact angle θ1 may be 60°.

In addition, the bump stopper 23 is provided with second reinforcing blocks 41 and 43 integrally formed respectively with the upper and lower convex portions B1 and B2. The second reinforcing blocks 41 and 43 have a constant width W2 along a circumferential direction of the upper and lower convex portions B1 and B2 at a line disposed apart from the parting line PL by 90°.

Figure 6:
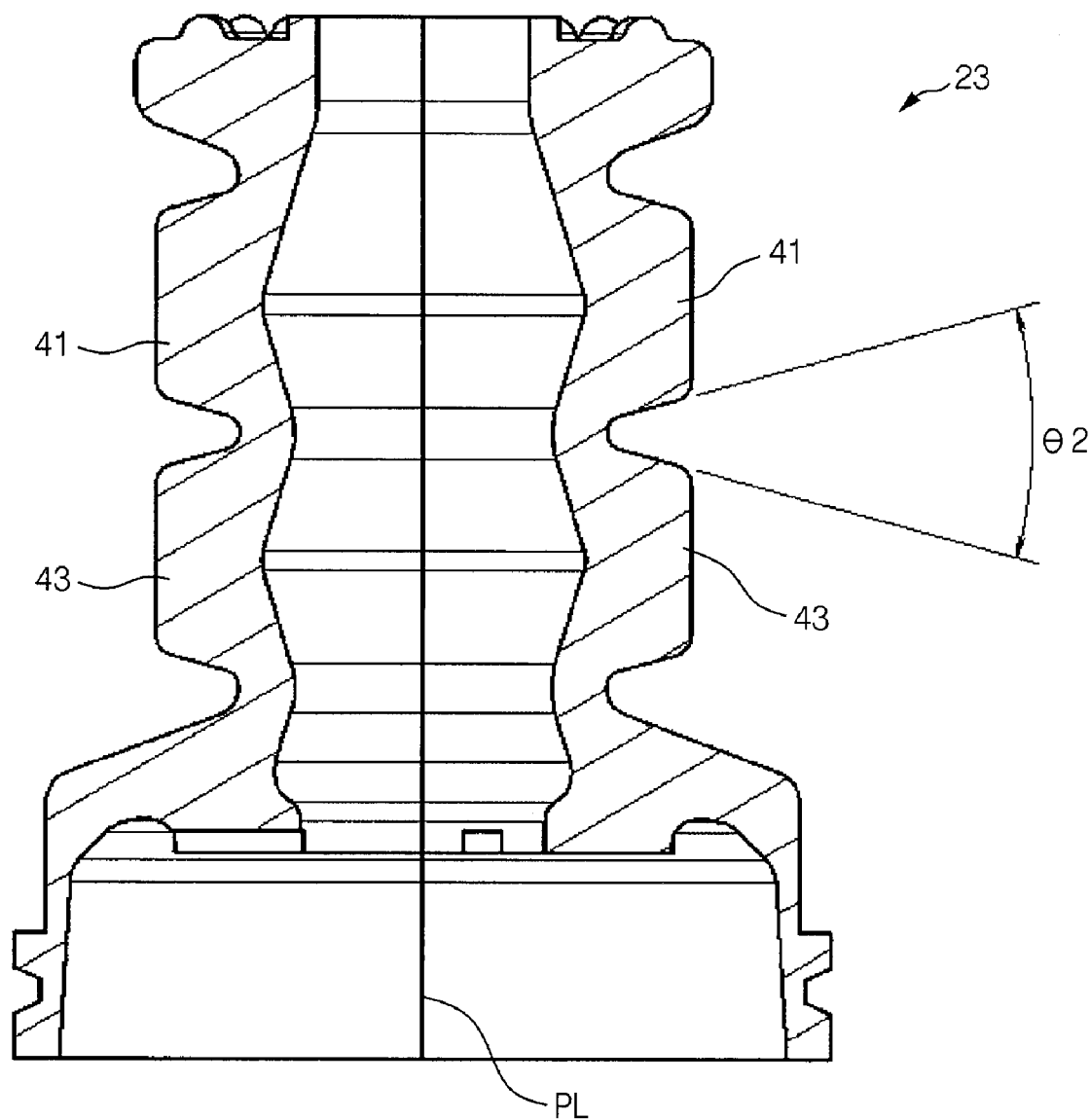
FIG. 6 is a cross-sectional view taken along the line B-B in FIG. 4.

Here, the second upper and lower reinforcing blocks 41 and 43, as shown in FIG. 6, form a second contact angle θ2 therebetween. The second contact angle θ2 may be 30°.

Since the first contact angle θ1 between the first upper and lower reinforcing blocks 31 and 33 that are formed at the parting line PL is larger than the second contact angle θ2 between the second upper and lower reinforcing blocks 41 and 43, the second upper and lower reinforcing blocks 41 and 43 contact each other earlier than the first upper and lower reinforcing blocks 31 and 33 when the bump stopper 23 is compressed. Therefore, a load applied to the parting line PL that has low durability may be reduced.

In addition, width W2 of the second upper and lower reinforcing blocks 41 and 43 is wider than the width W1 of the first upper and lower reinforcing blocks 31 and 33 such that durability of the second upper and lower reinforcing blocks 41 and 43 that contact first with each other when being compressed can be reinforced.

According to the bump stopper 23 for a suspension system, in various embodiments of the present invention, the second upper and lower reinforcing blocks 41 and 43 forming the second contact angle θ2 therebetween contact first with each other when being compressed and absorb vibration and impact.

After that, the first upper and lower reinforcing blocks 31 and 33 forming the first contact angle θ1 (60°) therebetween contact each other. Therefore, a load applied to the parting line PL that has low durability can be reduced.

In other exemplary embodiments of the present invention, the number of the first upper and lower reinforcing blocks 31 and 33 formed in the convex portions B1 and B2 may be less than that of the second upper and lower reinforcing blocks 41 and 43 formed in the convex portions B1 and B2 respectively so that the contact of the second upper and lower reinforcing blocks 41 and 43 may occur at first.

In still other exemplary embodiments of the present invention, a plurality of the second reinforcing blocks 41 and 43 may be disposed such that a first group of the second reinforcing blocks 41 and 43 is apart with 90° from the first upper and lower reinforcing blocks 31 and 33, a second group of the second reinforcing blocks 41 and 43 is apart with 180° from the first upper and lower reinforcing blocks 31 and 33, a third group of the second reinforcing blocks 41 and 43 is apart with 270° from the first upper and lower reinforcing blocks 31 and 33, in a circumference direction of the bumper stopper so that a load applied to the bumper stopper can be distributed to the plurality of the second reinforcing blocks 41 and 43.

According to a bump stopper for a suspension system of the present invention, stress applied to the bump stopper may be decentralized as a consequence of reinforcing blocks having a predetermined contact angle being provided respectively at upper and lower exterior circumferences of the bump stopper that contact each other in a compressed state of the bump stopper. Since the contact angle between the upper and lower reinforcing blocks formed at a parting line is largest, the upper and lower reinforcing blocks at the parting line contact each other lastly. Therefore, a load applied to the parting line may be reduced and accordingly durability may be enhanced.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bump stopper for a suspension system comprising:
   two permanently bonded halves defining a parting line therebetween that extends in a longitudinal direction, and defining coaxially aligned upper and lower convex portions that are compressible;
   first upper and lower reinforcing blocks integrally attached on respective upper and lower convex portions and having a first circumferential width, the first upper and lower reinforcing blocks being longitudinally aligned and positioned along the parting line, wherein first adjacent surfaces of the first upper and lower reinforcing blocks form a first contact angle therebetween; and
   second upper and lower reinforcing blocks integrally attached on respective upper and lower convex portions and having a second circumferential width, the second upper and lower reinforcing blocks being longitudinally aligned and positioned circumferentially offset from the parting line, wherein second adjacent surfaces of the upper and lower reinforcing blocks form a second contact angle therebetween;
   wherein the second contact angle is smaller than the first contact angle; and
   wherein the second adjacent surfaces contact each other earlier than the first adjacent surfaces when the bumper stopper is compressed.

2. The bump stopper of claim 1, wherein the second circumferential width is larger than the first circumferential width.

3. The bump stopper of claim 1, wherein the second upper and lower reinforcing blocks are offset 90° from the parting line.

4. The bump stopper of claim 1, wherein the first and second upper and lower convex portions are monolithically formed.

5. The bump stopper of claim 1, wherein respective longitudinal lengths of the first and second upper and lower convex portions are substantially equal.

6. The bump stopper of claim 1, comprising a pair of said first upper and lower reinforcing blocks and a pair of said second upper and lower reinforcing blocks.

7. The bump stopper of claim 1, wherein vertices of the first and second contact angles are coplanar.

8. A bump stopper for a suspension system comprising:
   two permanently bonded halves defining a parting line therebetween that extends in a longitudinal direction, and defining coaxially aligned upper and lower convex portions that are compressible;
   first upper and lower reinforcing blocks integrally attached on respective upper and lower convex portions and having a first circumferential width, the first upper and lower reinforcing blocks being longitudinally aligned and positioned along the parting line, wherein first adjacent surfaces of the first upper and lower reinforcing blocks form a first contact angle therebetween; and
   second upper and lower reinforcing blocks integrally attached on respective upper and lower convex portions and having a second circumferential width, the second upper and lower reinforcing blocks being longitudinally aligned and positioned circumferentially offset from the parting line, wherein second adjacent surfaces of the upper and lower reinforcing blocks form a second contact angle therebetween;
   wherein the second circumferential width is larger than the first circumferential width; and
   wherein the second adjacent surfaces contact each other earlier than the first adjacent surfaces when the bumper stopper is compressed.

9. The bump stopper of claim 8, wherein the second contact angle is smaller than the first contact angle.

10. The bump stopper of claim 8, wherein the second upper and lower reinforcing blocks are offset 90° from the parting line.

11. The bump stopper of claim 8, wherein the first and second upper and lower convex portions are monolithically formed.

12. The bump stopper of claim 8, wherein respective longitudinal lengths of the first and second upper and lower convex portions are substantially equal.

13. The bump stopper of claim 8, comprising a pair of said first upper and lower reinforcing blocks and a pair of said second upper and lower reinforcing blocks.

14. The bump stopper of claim 8, wherein vertices of the first and second contact angles are coplanar.

* * * * *